United States Patent [19]

Ngo

[11] Patent Number: 5,736,047
[45] Date of Patent: Apr. 7, 1998

[54] HYBRID BIOLOGICAL NUTRIENT REMOVAL SYSTEM

[75] Inventor: Viet H. Ngo, Minneapolis, Minn.

[73] Assignee: Lemna Corporation, St. Paul, Minn.

[21] Appl. No.: 434,659

[22] Filed: May 4, 1995

Related U.S. Application Data

[63] Continuation-in-part of Ser. No. 395,451, Feb. 28, 1995.

[51] Int. Cl.$^6$ .................................. C02F 3/30; C02F 3/32
[52] U.S. Cl. ...................... 210/602; 210/605; 210/624; 210/903; 210/170; 210/195.3
[58] Field of Search ................... 210/602, 605, 210/622, 624, 626, 630, 631, 903, 906, 170, 195.1, 195.3, 259

[56] References Cited

U.S. PATENT DOCUMENTS

| | | | |
|---|---|---|---|
| 3,698,881 | 10/1972 | White | 210/602 |
| 4,056,465 | 11/1977 | Spector | 210/605 |
| 4,267,038 | 5/1981 | Thompson | 210/170 |
| 4,415,450 | 11/1983 | Wolverton | 210/605 |
| 4,536,988 | 8/1985 | Hogen | 210/602 |
| 4,556,491 | 12/1985 | Spector et al. | 210/626 |
| 4,645,592 | 2/1987 | Calltharp et al. | 210/525 |
| 4,648,967 | 3/1987 | Calltharp et al. | 210/523 |
| 4,695,376 | 9/1987 | Astrom et al. | 210/523 |
| 4,711,716 | 12/1987 | Calltharp et al. | 210/525 |
| 4,724,073 | 2/1988 | Calltharp et al. | 210/258 |
| 4,775,467 | 10/1988 | Calltharp et al. | 210/525 |
| 4,793,929 | 12/1988 | Kiskuth et al. | 210/903 |
| 4,818,391 | 4/1989 | Love | 210/926 |
| 4,883,602 | 11/1989 | Anderson | 210/525 |
| 4,891,128 | 1/1990 | Gononsey | 210/525 |
| 4,997,557 | 3/1991 | Anderson | 210/242.2 |
| 5,036,882 | 8/1991 | Norcross et al. | 210/136 |
| 5,078,882 | 1/1992 | Northrup | 210/602 |
| 5,096,577 | 3/1992 | Ngo et al. | 210/170 |
| 5,104,528 | 4/1992 | Christie | 210/122 |
| 5,106,494 | 4/1992 | Norcross | 210/525 |
| 5,137,625 | 8/1992 | Wolverton | 210/602 |
| 5,180,501 | 1/1993 | Ngo et al. | 210/747 |
| 5,188,729 | 2/1993 | Krofta | 210/525 |
| 5,205,936 | 4/1993 | Topnik | 210/620 |
| 5,217,609 | 6/1993 | Holdeman | 210/195.3 |
| 5,234,580 | 8/1993 | Murphy | 210/122 |
| 5,252,205 | 10/1993 | Schaller | 210/521 |
| 5,256,281 | 10/1993 | Ngo et al. | 210/602 |
| 5,264,127 | 11/1993 | Ngo et al. | 210/602 |

FOREIGN PATENT DOCUMENTS

| | | |
|---|---|---|
| 390265 | 10/1990 | European Pat. Off. . |
| 148946 | 6/1981 | German Dem. Rep. . |
| 63-209794 | 8/1988 | Japan . |

OTHER PUBLICATIONS

"ICEAS Wastewater Treatment Systems", product brochure, austgen bioget.

"Design Considerations for Single–Sludge Nitrification–Denitrification Processes", pp. 249–253, 259–261 and 277–282 in Chapter 8 in (EPA Manual. Nitrogen Control. EPA/625/R–93/010. Sep., 1993).

"Phosphorus Removal by Biological Processes", (Chapter 3, pp. 15–30 in EPA Design Manual. Phosphorus Removal. EPA/625/1–87/001. Sep., 1987.

"Biolac Wastewater Treatment Systems", product brochure, Parkson Corporation.

Primary Examiner—Christopher Upton
Attorney, Agent, or Firm—Fredrikson & Byron, P.A.

[57] ABSTRACT

A hybrid system and related process for the removal of biological nutrients from wastewater. The system provides an activated sludge system, including both a single-sludge reactor and clarification unit, flowably connected with a final aquaculture pond for final polishing of BOD from the clarified mixed liquor supernatant.

41 Claims, 3 Drawing Sheets

HYBRID BIOLOGICAL NUTRIENT REMOVAL SYSTEM

CROSS-REFERENCE TO RELATED APPLICATIONS

This application is a continuation-in-part of co-pending U.S. application Ser. No. 08/395,451 for a "Hybrid Biological Nutrient Removal System", filed Feb. 28, 1995 naming Viet H. Ngo as inventor.

TECHNICAL FIELD

The present invention relates to the field of biological treatment of wastewater, and in particular to aquaculture processes and activated sludge processes for wastewater treatment. In another aspect, the invention relates to methods, such as secondary clarification, involved in the processing of the mixed liquor derived from an activated sludge process.

BACKGROUND OF THE INVENTION

Waste water treatment processes can take many forms, including those that rely on physical, chemical, and/or biological treatment processes. Among the biological processes commonly employed are those that rely on aerobic, anaerobic, or combined aerobic-anaerobic processes. Examples of such biological processes include aquaculture, aerobic stabilization ponds, trickling filter processes, and activated sludge processes.

The purpose underlying the biological treatment of wastewater is to coagulate and/or remove the nonsettleable colloidal solids as well as to reduce the organic content of the wastewater. Wastewater typically contains a number of constituents that must be removed or reduced to acceptable levels. These constituents are frequently expressed in such terms as Total Suspended Solids (TSS), which typically ranges from 100 to 300 or more mg/liter in wastewater.

Biological Oxygen Demand (BOD) is another common parameter, and typically ranges from 100 mg/liter to as high as 300 mg/liter or more. BOD is determined by measuring the dissolved oxygen used by microbes in the oxidation of the organic matter, and is an important and frequently used measure of the quality of wastewater treatment processes.

Other important constituents of wastewater include Total Nitrogen "TN", including organic, free ammonia, nitrites and nitrates), which often ranges from about 20 to about 85 mg/liter in wastewater, and Total Phosphorus ("TP", including organic and inorganic) which typically ranges from about 6 to about 20 mg/liter.

Correspondingly, it is the goal of the wastewater treatment process to reduce those values to values acceptable for the intended use of the water. To produce water meeting advanced treatment standards, for instance, TSS typically needs to be reduced to on the order of 10 mg/liter or less, while BOD typically is reduced to on the order of 10 mg/liter or less. Similarly, TN and TP are often reduced to on the order of 5 mg/liter and 1 mg/liter, respectively.

Traditional pond-based natural treatment involves the use of algae and/or other microbes grown in a pond or lagoon. In many countries, stabilization and facultative ponds are popular means of treating wastewater for both domestic and industrial wastes. Pond systems are particularly effective in "polishing" BOD, as well as for fecal coliform reduction, if the ponds are not hydraulically overloaded. However, excess algae growth can itself cause high suspended solids in the effluent during warm summer months. Moreover, such ponds are typically less effective or incapable of removing nutrients (e.g., nitrogen, phosphorus, and heavy metals).

In recent years a number of advances in the use of aquaculture to enhance the efficiency and effectiveness of natural treatment have been developed. These include systems such as those developed by the Lemna Corporation, which has patented technology that incorporates the natural abilities of common duckweed. See, e.g., U.S. Pat. Nos. 4,536,988, 5,096,577, 5,256,281, 5,180,501, and 5,264,127. This technology is based upon a pond system that employs duckweed maintained in a series of floating barriers, or cells. The cells allow the containment of a plant mat of organisms on the water surface. As described in greater detail below, the system generally also involves the use of hydraulic baffles for flow control. Often the system also includes a piping manifold system for flow distribution, as well as unique plant harvesting systems.

Other forms of biological processing include traditional activated sludge systems, which were first developed in England as early as 1914. Such systems involve the production of an activated mass of microbes capable of aerobically stabilizing wastewater. Although a wide array of such processes now exists, those commonly known as "single-sludge" systems have been growing in popularity since they were first developed and applied in the 1960's.

Single-sludge systems combine carbonaceous removal, nitrification and denitrification, and phosphorus removal within the same process, generally using a single sedimentation step for separation of the sludge. See, for instance, "Phosphorus Removal by Biological Processes", (Chapter 3 in EPA Design Manual. Phosphorus Removal. EPA/625/1-87/001. September, 1987), and "Design Considerations for Single-Sludge Nitrification-Denitrification Processes", Chapter 8 in (EPA Manual. Nitrogen Control. EPA/625/R-93/010. September, 1993), the disclosures of both of which are incorporated herein by reference.

Single-sludge systems, which will be described in greater detail below, are generally classified according to such parameters as their flow regime, their staging of anaerobic, anoxic and aerobic sequences, and/or their method of aeration. Typically the aerobic sequences are employed for organic carbon conversion, nitrification (i.e., the conversion of ammonium ion to nitrate by nitrifying autotrophic bacteria), and the uptake of phosphorus. The anoxic sequences are employed for denitrification, i.e., the reduction of nitrate under anaerobic conditions to produce nitrite, nitrous oxide or nitrogen gas. The anaerobic sequences are employed to condition the sludge biomass so as to eliminate bulking and to select for microorganisms that will subsequently take up phosphorus in the aerobic sequence.

An example of such a system is provided in U.S. Pat. No. 4,056,465 (reissued as Re 32,429; Spector), which describes a modified activated sludge system wherein BOD-containing wastewater and recycled sludge are initially admixed under anaerobic conditions and subsequently subjected to aeration and clarification. By the operation disclosed, the selective production of non-bulking biomass is favored, together with the effective removal of phosphorus. A further modification of this process can be achieved by interposing an anoxic treatment zone between the anaerobic zone and aerated zone, which will lead to the removal of nitrates and nitrites from the wastewater.

An alternative to the use of such multistage processes is the sequencing batch reactor ("SBR"), one of the oldest wastewater treatment technologies. In an SBR process all treatment is carried out within a single reactor in which alternating aerobic and anoxic conditions are achieved on a temporal basis by pulsing the aeration mechanism on a timed cycle. Following aeration, the mixed liquor in an SBR is then held in a quiescent state during a settling sequence as the sludge settles to the bottom. A decanting sequence is then initiated in which a portion of the clarified supernatant fluids is withdrawn from the reactor. This is followed by a refilling of the reactor with raw wastewater and a new cycle of aerobic and anoxic treatment sequences.

An intermediate product common to most activated sludge systems is the production of a "mixed liquor". The mixed liquor includes both a suspended solids component as well as a liquid component, and typically represents at least an initial endpoint of the biological phase of the activated sludge process. Downstream from the point of the mixed liquor, the activated sludge process generally continues in a mechanical, rather than biological sense, by causing the separation of the solid and liquid phases.

Once separated, a portion of the solid phase known as return activated sludge ("RAS") can be returned to any of a number of points within the biological phase of the activated sludge process. The remaining sludge portion ("waste activated sludge") can be subjected to a variety of processes intended to reduce its water and organic content. Such processes include those intended for the treatment of organic matter in the sludge, (such as digestion, incineration, and wet oxidation), as well as those intended for the removal of water or moisture from the sludge, such as concentration (thickening), conditioning, dewatering, and drying.

The separation of sludge is a critical component in an activated sludge system. A variety of settling tank designs exist, depending on the type of system employed. For instance, primary sedimentation tanks are often employed as either the principle treatment process or as a preliminary step to reduce the load on a subsequent biological treatment.

The sedimentation process associated with the later, post-biological, phase of an activated sludge process is commonly known as "secondary clarification". Secondary clarification serves to separate the activated sludge solids from the remainder of the mixed liquor in order to produce a well clarified, stable effluent that is relatively low in BOD and suspended solids.

The design of traditional sedimentation tanks must address a number problems that are common to sludge, including the need to allow solids to settle within an acceptable detention time. The detention time and efficiency of the process are based on such factors as the type of tank (e.g. circular or rectangular), surface loading (i.e., overflow) rate, solids loading rate, flow-through velocities, weir placement and scum removal. The tanks and systems associated with secondary clarification therefore tend to be complex and expensive. The sedimentation of mixed liquor, in turn, tends to be a time-consuming, costly, and engineering intensive process.

Attempts to reduce the complexity or costliness of secondary clarifier systems while maintaining or increasing their efficiency have been described, for instance, in U.S. Pat. Nos. 4,645,592; 4,724,073; 4,775,467; 5,188,729; 5,217,609; and 5,252,205.

The steps associated with secondary clarification in SBR reactors, for instance, are all carried out in the same reactor vessel in which treatment is performed. A number of factors make this settling and decanting system almost as costly as the more traditional, separate clarifiers. In particular, complicated mechanisms need to be employed in an SBR system to prevent contamination of the clarified supernatant with solids. Such solids include those that have settled in the effluent structure of the decanting apparatus, as well as those that remain suspended due to turbulence or bulking, and those that have been resuspended by the flow turbulence created by the decanting apparatus itself.

Attempts to avoid such problems in SBR systems have been described as well, for instance, in U.S. Pat. Nos. 4,648,967; 4,695,376; 4,711,716; 4,818,391; 4,883,602; 4,891,128; 4,997,557; 5,036,882; 5,104,528; 5,106,494; 5,205,936; and 5,234,580.

In operation, secondary clarification requires a significant amount of oversight and monitoring. The process is prone to problems with rising sludge, as well as bulking and overloading of sludge. U.S. Pat. No. 4,556,491, for instance, addresses the problem of rising sludge in secondary clarifiers by minimizing entrainment of nitrogen gas with mixed liquor entering the transfer pipe to the clarifier. In this manner the level of dissolved nitrogen in the biomass that settles in the clarifier remains less than the level that exists in equilibrium with nitrogen gas at the pressure prevailing in the biomass.

As a result, activated sludge facilities tend to be quite expensive, largely in view of cost involved in the construction of the reactors and clarifiers. Conventional activated sludge reaction chambers are constructed of concrete and metal, generally in the form of above-ground tanks.

There have been relatively few examples in the art of activated sludge systems in forms other than tanks. A system that employs a basin construction, known as the "Biolac" system, is available from Parkson Corporation. The Biolac system is based on the use of controlled air distribution to provide "moving waves" of multiple oxic and anoxic environments within a single basin format. The basin, in turn, is described as including an integral clarifier. The clarifier, however, is of a conventional variety in that it employs a continuous flow system having a sludge collection mechanism at its bottom.

Secondary clarification units can also represent a particularly expensive component of an activated sludge treatment system, often involving up to 50% or more of the total investment in establishing such a system. Sludge handling systems also contribute to the high costs associated with activated sludge systems.

Despite the above-described disadvantages, activated sludge systems continue to possess a number of advantages over natural systems. For instance, the performance of an activated sludge system is typically less affected by cold weather than that of a natural system. Cold weather does tend to reduce the efficiency of an activated sludge system, although the high reaction rates make it possible to obtain complete treatment. Treatment in cold weather simply requires a detention time that is short enough to ensure that the process can be completed while there is still an adequate temperature in the water column. In contrast, the water column in natural systems, under cold conditions, can drop to inhibitory temperatures long before treatment is complete.

It would be particularly desirable to have a system that is less expensive to construct, yet provides high reaction rates and efficiency in all climates, in terms of the removal of wastewater contaminants, ease of use, and reduced susceptibility to shock loadings.

SUMMARY OF THE INVENTION

The present invention provides a "hybrid" wastewater treatment system and related process that effectively combines desirable attributes of traditional activated sludge and aquaculture systems.

The present invention provides a process for the removal of biological nutrients from wastewater, the process comprising the steps of:

(a) providing;

(i) an activated sludge system comprising a single-sludge reactor and a clarifier unit, the clarifier unit comprising both a settling zone and a clarification zone, and (ii) an aquaculture pond flowably connected with the clarification zone of the activated sludge system;

(b) treating wastewater in the single-sludge reactor to produce a mixed liquor, (c) transferring the mixed liquor to the clarifier unit and operating the clarifier unit to settle a sludge fraction in order to obtain a clarified supernatant fraction in the clarification zone, (d) transferring clarified supernatant to the aquaculture pond, and (e) incubating the pond under conditions suitable to provide a further reduction in contaminants from the clarified supernatant.

In such an embodiment, it is preferable to employ a clarifier unit of the type described in greater detail below, wherein flow within the clarifier unit can be interrupted in order to decant supernatant.

In yet a further preferred embodiment, the activated sludge system is a multistage system flowably connected with the aquaculture pond. Such a system can be provided in either stand-alone, above-ground form, or can itself be provided in a pond-based form, e.g., positioned in apposition to the aquaculture pond.

In the latter embodiment the activated sludge system and aquaculture components can be provided as an integral unit formed within a single overall pond geometry employing a continuous outer wall.

The invention further provides a system for the removal of biological nutrients from wastewater, the system comprising:

(a) an activated sludge system comprising;

(i) an activated sludge reactor for initial biological oxidation of organic matter to produce a mixed liquor, and (ii) a clarifier unit flowably connected to the activated sludge reactor for the separation of clarified supernatant and settled sludge from the mixed liquor, and (b) an aquaculture pond flowably connected to the clarifier unit for providing a further reduction in organic matter and suspended solids from the clarified supernatant.

In a further preferred embodiment the invention provides a system for the removal of biological nutrients from wastewater, the system comprising:

(a) a pond-based activated sludge system comprising;

(i) an activated sludge reactor for initial biological oxidation of organic matter to produce a mixed liquor, and (ii) a clarifier unit flowably connected to the activated sludge reactor for the separation of clarified supernatant and settled sludge from the mixed liquor, and (b) an aquaculture pond positioned in apposition to the activated sludge system and flowably connected to the clarifier unit for providing a further reduction in organic matter and suspended solids from the clarified supernatant.

Optionally, the system further comprises a second aquaculture pond useful as a sludge stabilization lagoon for the waste sludge portion described above, the second pond being connected to the clarifier unit via a sludge piping and flow control system. Optionally, sludge can also be withdrawn from the activated sludge system and recycled to a fermentation basin. The basin can be positioned upstream of (i.e., preceeding) the sludge reactor in order to provide treatment of the influent wastewater flowstream. A portion of this withdrawn sludge can be periodically sent as waste to a separate basin for treatment prior to disposal.

In a preferred embodiment, the activated sludge system, which itself comprises sludge reactor and clarification units, is constructed in a pond-based configuration. The term "pond-based", as used herein, refers to a system, and components thereof, that is constructed at least partially below ground level, and having one or more walls with a slope defined by the surrounding earthen contour.

In yet a further preferred embodiment, the activated sludge and aquaculture components are provided as an integral system. In such an integral system both the pond-based activated sludge component and the aquaculture pond component are formed within a single overall pond geometry employing a continuous outer earthen wall, thereby reducing the overall cost of construction and facilitating the operation of the system.

In such an embodiment, the area defined by the circumference of the outer earthen wall comprises the key components of the system, i.e., the activated sludge and aquaculture components. The components are each provided in discrete form, separated by impermeable walls. In a particularly preferred embodiment, the various zones making up the sludge reactor of the activated sludge component are also provided in discrete form, for instance, the sludge reactor and clarification units are separated by impermeable walls.

The hybrid system of the present invention couples the year-round effectiveness of single-sludge processes with the reduced construction and operating costs associated with a pond system. The result is a system having an optimal combination of such qualities as robustness to variations in temperature and loading as well as ease of operation and maintenance.

The system of the present invention employs a simplified, and relatively inexpensive clarification method in order to provide a link between a modified sludge process and an aquaculture pond to achieve final polishing. This system permits useful recovery of solids without the demanding efficiencies of clarification that are required in traditional approaches. This results in substantial cost-savings in the clarification step. As an added benefit, the present system simplifies overall sludge management.

In an alternative embodiment the present invention provides a process for the removal of biological nutrients from wastewater, the process comprising the steps of:

(a) providing pond-based activated sludge system comprising a single-sludge reactor and a clarifier unit, and an aquaculture pond component positioned in apposition to, and flowably connected with, the activated sludge system, (b) treating wastewater in the single-sludge reactor to produce a mixed liquor, (c) transferring the mixed liquor to the clarifier unit and operating the clarifier unit to settle a sludge fraction in order to obtain a clarified supernatant fraction, (d) transferring clarified supernatant to the aquaculture pond, and (e) incubating the pond under conditions suitable to provide a further reduction in contaminants from the clarified supernatant.

In a particularly preferred embodiment, in addition to transferring the treated supernatant to an aquaculture pond the process includes the further steps of:

(a) dividing the settled sludge into waste and return portions, (b) transferring the return portion of the sludge to one or more points in the single-sludge reactor, and (c) transferring the waste portion of the sludge to a sludge stabilization lagoon.

The process of the invention allows the treatment of wastewater in a single, suspended growth sludge system. The process provides for the biological oxidation of organic matter, biological nitrification, and denitrification of nitrogenous compounds, and biological removal of phosphorus. In addition, the process allows the clarification of the treated waste water without the need for a traditional, and expensive, secondary clarifier. Moreover, the process avoids the need to stabilize waste sludge, or otherwise monitor or handle sludge on a daily basis.

DETAILED DESCRIPTION

The invention provides a hybrid system comprising a single-sludge reactor, clarifier unit, and an aquaculture pond, together useful for accomplishing the process described herein.

The activated sludge system (including both the single sludge reactor and clarifier unit) can be provided in any suitable form, including as tanks constructed above-ground level. In turn, the invention provides the ability to retrofit an existing activated sludge system in order to provide a new hybrid system. Such a retrofit would generally involve the construction of a suitable aquaculture pond, and flowably connecting that pond to the existing system.

Often, a clarifier unit of the type described herein will need to be provided in order to complete the hybrid system. Such a hybrid system would provide substantial savings, in terms of cost and materials, while providing improved performance over the original system.

In a preferred embodiment, the system is constructed as an integral system by establishing the zones and chambers of the sludge reactor and the clarifier unit in apposition to the aquaculture pond and integrated into the overall pond geometry. An integral system provides an optimal combination of benefits, in terms of the ease and cost of construction and operation.

The components of the system are connected by respective piping and flow control systems, i.e., series of control valves and associated piping, which together can be selectively operated, e.g., opened or closed, to perform single or multiple pumping mechanisms. The word "connect", and inflections thereof (including the term "flowably connected"), will be used in this respect to refer to a functional relationship between such components. Those skilled in the art will appreciate the manner in which such flow control systems can be constructed as direct or indirect flow paths, and can include optional and ancillary flow paths and processes.

As an initial component, the system comprises a single-sludge reactor, preferably in the form of a continuous flow, multistage single-sludge reactor, for the initial biological oxidation of organic matter to produce a mixed liquor. Those skilled in the art will appreciate the manner in which conventional single-sludge processes can be employed in the hybrid system of the present invention. Suitable single sludge reactors can be selected from the group consisting of multistage, multiphase/cyclical aeration, oxidation ditches, and sequencing batch reactor systems. Examples of suitable single sludge reactors are described, for example, in "Design Considerations for Single-Sludge Nitrification-Denitrification Processes", Chapter 8 in (EPA Manual. Nitrogen Control. EPA/625/R-93/010. September, 1993), the disclosure of which is incorporated by reference.

In particular, various forms of suitable multistage reactors can subdivided in to those providing a single anoxic zone and those providing multiple anoxic zones. Examples of the former are described in greater detail below, and include those known as anaerobic/anoxic/oxic (A2/O), Modified Ludzack-Ettinger (MLE), Virginia Initiative Plant (VIP), and University of Capetown (UCT) processes. Examples of the latter, and in particular dual anoxic zone processes, include those known as Bardenpho and Modified UCT processes.

Multiphase/cyclical aeration processes generally involve alternating anoxic/aerobic sequences in either a continuous flow reactor or in compartments by pulsing the aeration source. Oxidation ditches, in turn, involve the flow of wastewater in a continous circuitous path, with aeration provided at fixed points along the path. Anoxic conditions are achieved between the aerators as oxygen is depleted.

Finally, sequencing batch reactor systems involve the use of an aeration mechanism that is pulsed on a timed cycle in order to achieve aerobic and anoxic conditions on a temporal basis within a single reactor.

In a preferred embodiment, the single sludge reactor comprises a multistage system. Common variations of multistage, single-sludge reactors that can be incorporated in the present system include suspended growth processes without an anoxic zone, those employing one anoxic zone, and those using multiple anoxic zones. Variations employing just anaerobic and aerobic zones are primarily useful for applications dedicated to phosphorus removal only in addition to BOD and TSS reduction.

An example of such a variation is the process known commonly as the "Ludzack-Ettinger process". This process uses a single anaerobic zone followed by a single aerobic zone. Another example of a suitable single-sludge process is that known as the "A/O process", which is similar in many respects to the Ludzack-Ettinger process but using multiple anaerobic cells followed by multiple aerobic cells.

For applications in which nitrogen removal is a prime objective, with or without phosphorus reduction, variations involving a single anoxic zone may be incorporated in the hybrid system. Such variations can include processes analogous to those known in the art as the "A2/O", "UCT" and "VIP" processes.

In the A2/O system, for instance, a single anoxic zone is interposed between a single anaerobic zone and a single aerobic zone. The aerobic mixed liquor is recycled to the anoxic zone (at 1–3× the flow rate) while the RAS is recycled to the anaerobic cell (at 0.3–0.5× the flow rate).

The UCT process has a similar sequence of three zones and a recycle of mixed liquor to the anoxic cell (at 1–2× flow rate). The RAS recycle (at 0.5–1× the flow rate), however, is directed to the anoxic zone and, subsequently, anoxic cell mixed liquor is transferred to the anaerobic zone (at 1–2× the flow rate).

The flow of RAS and aerobic/anoxic mixed liquor in the VIP process is similar to that of the UCT process. However, the VIP process uses multiple, complete mix zones instead of the single anaerobic zone intended to enhance phosphorus uptake.

In other applications enhanced denitrification may be a prime objective. In such applications, variations involving multiple anoxic zones can be incorporated in the hybrid reactor system. Such variations include processes analogous to those known in the art as the "Bardenpho" (4-stage or 5-stage) system, and modified UCT or VIP systems. The Bardenpho process splits the aerobic zone into two cells and introduces a second, endogenous anoxic stage between them to enhance nitrogen removal. The 5-stage process differs from the 4-stage process by placing an anaerobic cell at the head of the treatment train.

The modified UCT and VIP processes provide two anoxic zones and two separate internal mixed liquor recycle lines. The lines serve to separate the RAS/anoxic recycle of the original from the recycle of the aerated mixed liquor to maintain denitrification. Separating the two recycle loops allows for increased efficiency in denitrification as well as reduced nitrate interference with phosphorus metabolism in the anaerobic reactor.

The single-sludge reactor used in a system of the present invention further provides at least one port useful for discharging the mixed liquor product of the single-sludge process, via a first piping and flow control system, to one or more clarifier units. A preferred clarifier unit of the present invention includes both a settling zone and a clarification zone, as described in greater detail below.

A clarifier unit of the present invention, in turn, is operably and flowably connected with the discharge port of the single-sludge reactor and includes a settling zone for the separation of purified supernatant from settled sludge. A clarifier unit of the invention can be of any suitable type or configuration, and preferably incorporates principles such as those employed in decanting clarified liquids, as practiced in sequencing batch reactor (SBR) decanter systems. See, e.g., U.S. Pat. Nos. 4,695,376 (Astrom et al.) and 4,711,716 (Calltharp et al.), the disclosures of which are incorporated herein by reference.

A suitable clarifier used in a system of this invention comprises at least one inlet port, i.e., mixed liquor receiving port, as well as one or more discharge ports for treated supernatant and sludge. The sludge discharge port is, in turn, operably and flowably connected by means of a sludge piping and flow control system with a suitable sludge distribution system, for controlling the flow of both return sludge and waste sludge. The supernatant discharge port is operably and flowably connected by means of a supernatant piping and flow control system with an aquaculture pond.

In a particularly preferred embodiment, the clarification unit is used to perform a continuous sedimentation process that is capable of being interrupted in order to decant supernatant. The decant phase of such a clarification unit can be achieved by the automatic opening of a simple valved outlet from the unit itself. The valved outlet can optionally be connected to a header pipe in order to provide for multiple, distributed inlet points. The use of multiple inlet points can serve to minimize solid loss from the basin. The header pipe, in turn, can optionally provide bottom-oriented vertical pipe inlets in order to minimize solids inventory in the header from other cycle phases. As a result, the decant cycle can be level-controlled or it can be time-controlled with an optional level override to the time control setting.

The word "interrupt" as used herein with respect to the clarifier unit, refers to a time and level control cycle that allows clarification to be temporarily suspended in order to decant supernatant.

The aquaculture pond, in turn, is flowably connected with the clarifier unit and useful for providing a further reduction in suspended solids, BOD and nutrients from the clarified supernatant. The aquaculture pond is operated in such a manner that the growth of algae is substantially inhibited, in order to prevent a rebound phenomena with suspended solids. The system of the present invention optionally, and preferably, further comprises a second aquaculture pond useful as a sludge stabilization lagoon.

Aquaculture ponds suitable for use in the present invention include those employing floating aquatic plants for treatment of wastewater. Suitable ponds and systems, including barrier designs and harvesting means, are described in U.S. Pat. Nos. 5,264,127, 5,256,281, 5,235,797, 5,197,263, 5,180,501, 5,161,354, 5,096,577, and 4,536,988, the disclosure of each of which is incorporated herein by reference.

In a preferred embodiment, the pond comprises one or more dividing walls, as well a berm (although hydraulic baffles can also be used), which together are used to channel the wastewater along a winding path for the removal of pollutants. Generally, the channel is constructed having parallel straight portions connected by U-turns, such that the flow is between turbulent and laminar flow regimes. The channel is also constructed so that the straight portions are perpendicular to the direction of the prevailing wind, thereby reducing the wind fetch. The U-turns may have a curvilinear guide to aid in directing the flow of water around the turn and onto the next straight portion to decrease wearing at the turn.

Preferably the channel includes an access location so that a harvester or barge can be launched onto the water and retrieved. The winding channel configuration is especially advantageous when combined with a grid containment system for containing duckweed plants used in wastewater treatment. The channel may also include baffles extending across the channel to further advantage.

The channel structure is especially effective when combined with a grid system for containing floating aquatic plants used in treating wastewater. The floating containment grid structure is constructed of individual grid sections which are reversible and float on the surface of the water. The grid sections include flotation chambers so that the grid sections are buoyant and extend above the water to a height sufficient to contain the floating aquatic plants.

The grid segments may be of any suitable length, but are preferably each of the same length for a given body of water, in order to facilitate their replacement. The reversibility allows the segments to be flipped upside down should the exposed portion of a flotation chamber be damaged. The individual grid sections are connected at the end portions, which are bent slightly from the longitudinal direction of the grid section so that they may be connected to the adjacent grid section having an end portion bent toward the first grid section.

A hollow connecting tube is inserted into holes in meshing fingers of the end portions so that a hinged connection is made when the hollow tube is inserted. The slightly bent end portions allow the grid sections to be folded against one another in a parallel arrangement. The floating chambers are preferably staggered so that they do not impinge on floating chambers of the adjacent grid sections. With this construction, a multiplicity of grid sections may be connected to form a Z-fold bundle for transporting to a deployment site.

The structure in the Z-fold connections allows for easy deployment of the grid sections to form a containment grid. The grid sections are preferably connected to form a Z-fold bundle which, when unfolded and deployed, extends the width of the body of water. When the Z-fold bundles have been transported to the shore of the body of water, the Z-fold bundles are connected at the hinges to adjacent Z-fold bundles by inserting a U-bolt through the hollow connecting tubes at the hinged portions of the Z-fold bundles.

The connected Z-fold bundles are then towed across the body of water with additional Z-fold bundles being added as required until the Z-fold bundles extend the length of the body of water. The Z-fold bundles are unfolded down the length of a channel and anchored to the shore. Additional Z-fold bundles are added and unfolded until the channel portion is covered by the grid structure and ready for containment of floating aquatic plants.

The grid structure remains buoyant so that the floating aquatic plants are contained, but has the flexibility so that if a harvester is floated across the water surface, the grid may be depressed under the water's surface so that the aquatic plants may be harvested.

Figure 1:
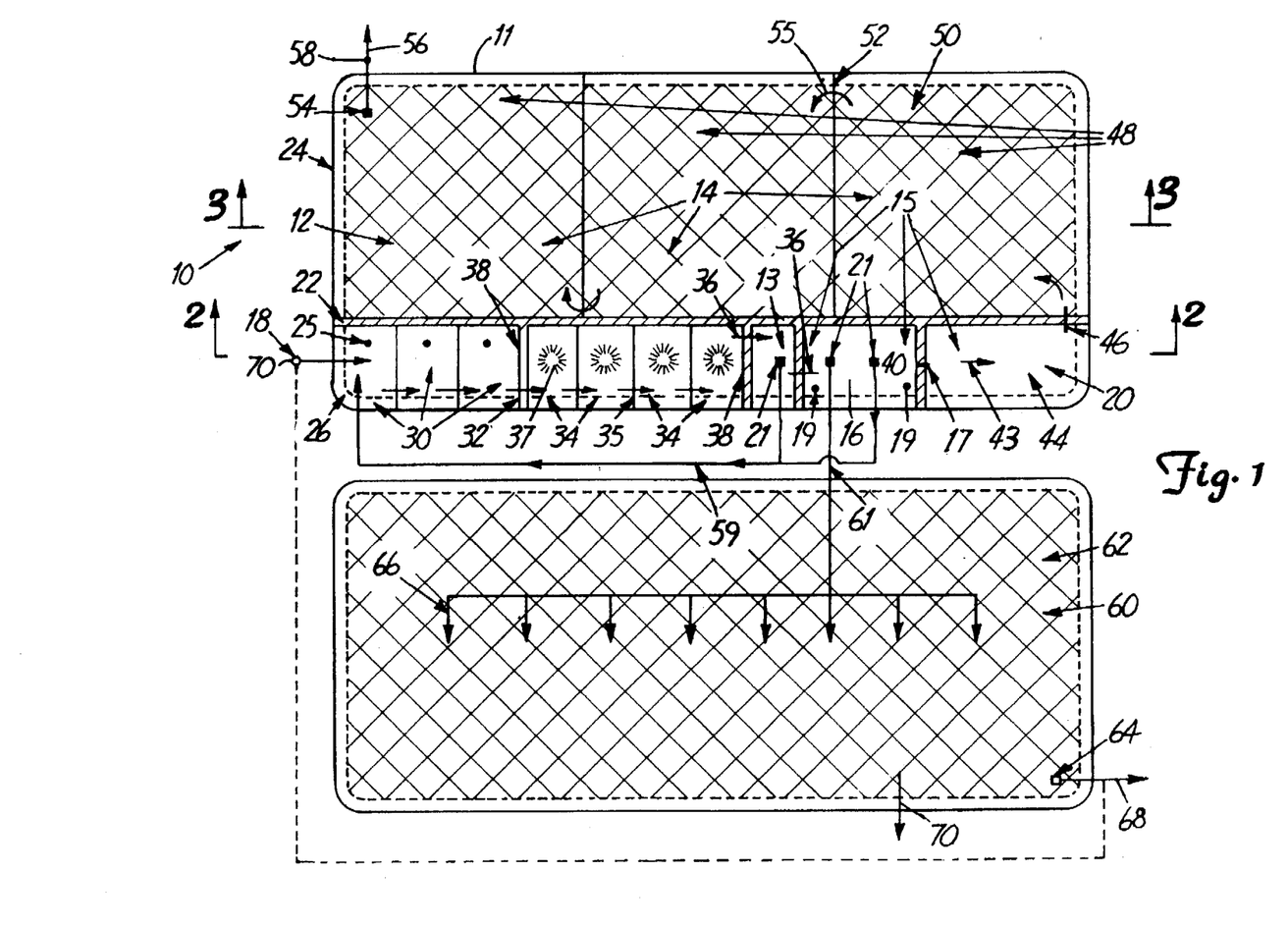
FIG. 1 shows a diagram of a preferred aquaculture pond/single-sludge hybrid system of the present invention.

The operation of a system of the present invention will be further described with reference to the Drawing. In FIG. 1 there is seen a diagram of a preferred aquaculture pond/single-sludge hybrid system 10 of the present invention. The system includes an earthen aquaculture pond 12, in apposition to which is placed an activated sludge component provided in the form of a single-sludge reactor 14 and a clarifying unit 15. The pond, single-sludge reactor, and clarification unit are formed as an integral system, contained within a unitary perimeter 11 forming the overall pond geometry.

The system shown in FIG. 1 also provides an optional preliminary treatment module 18, for the application of either screen/grit removal or other form of primary clarification.

The pond component itself is comprised of a watertight bottom 20, and a dividing wall 22. The pond also provides a graded slope portion 24, a stabilized slope portion 26, and a watertight bottom (not shown).

As depicted in FIG. 1, a single-sludge reactor 14 typically will include one or more cells making up an anaerobic zone 30, as well as an opening 32 for unidirectional flow of fluids from the anaerobic zone to one or more cells making up aerobic zone 34. Each cell is separated from adjacent cells of the same type by a hydraulic baffle or thinner concrete or wood wall divider, such as that depicted by reference number 35. The aerobic process steps are employed for organic carbon conversion as well as nitrification, i.e., the conversion of ammonium ion to nitrate by nitrifying autotrophic bacteria and the uptake of phosphorus. The anaerobic process steps are employed to condition the sludge biomass so as to eliminate bulking and to select for microorganisms that will subsequently take up phosphorus in the aerobic sequence.

Following aerobic processing in zones 34 the resulting mixed liquor is able to flow through unidirectional flow path opening 36 in concrete wall 38 to the clarifying unit 15. The settling zone 16 of clarifying unit 15 is long and narrow and comprises both a decanting zone 40, including bottom mixers 19, as well as a series of return sludge pumps 21. Preferably the unit also includes an actuated valve 17 for opening/shut time sequences, as well as submerged mixers 19. The RAS pumps and mixers may be operated in an alternating sequence to optimize the density of return sludge.

Optionally, but preferably, clarifying unit 15 also includes an inlet chamber 13 wherein RAS may be preferentially collected before the mixed liquor enters settling zone 16. One of the return sludge pumps 21 would be located in the base of inlet chamber 13 to pump RAS so preferentially collected.

In another optional, but preferred, embodiment clarifying unit 15 also includes a final clarification zone 44. Final clarification zone 44 is flowably and controllably connected to decanting zone 16 by means of valve 17, and to pond 12 by means of opening 46. The connection between the clarifying unit 15 and pond 12 is typically made by means of a supernatant piping and flow control system connecting final clarification zone 44 to the pond, with a flow direction indicated by reference number 43.

The pond itself is shown having a series of polishing zones 48 created by a floating barrier grid 50, with the optional inclusion of hydraulic baffles (e.g., as shown by reference number 52), capable of providing a serpentine flow path 55. The pond is operated by means of a hydraulic control structure 54 with various ports for controlling effluent discharge at various points. The pond is capable of discharging effluent through port 56 for either re-use or as effluent. Optionally disinfection and/or aeration units 58 can be included in the discharge process.

Figure 2:
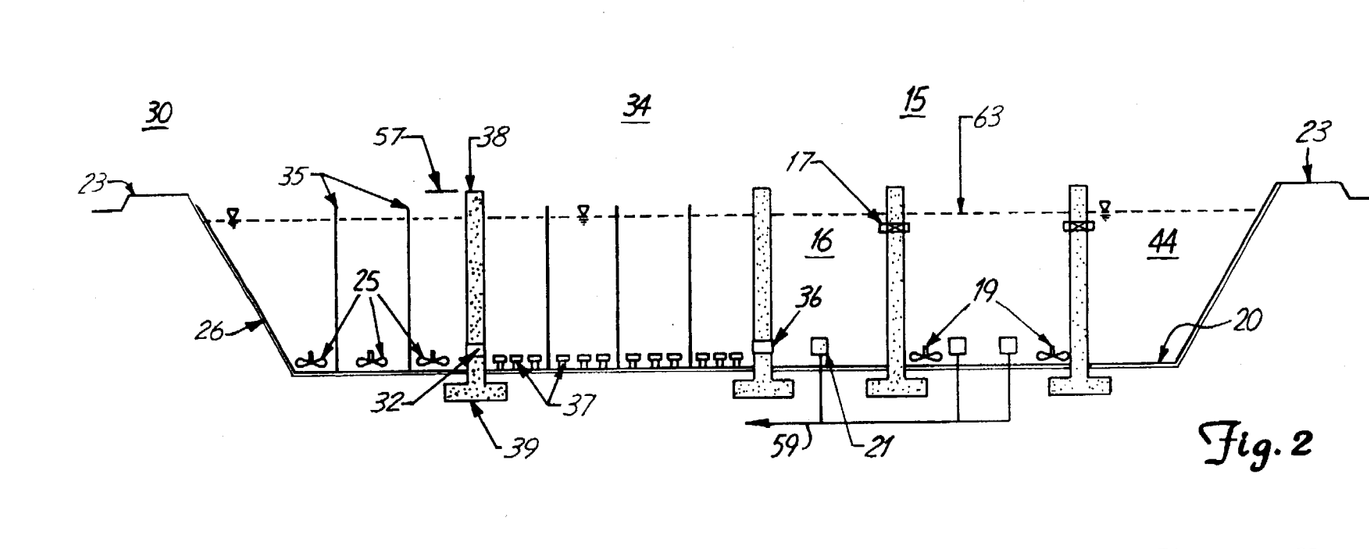
FIG. 2 shows a cross-sectional view taken along lines A—A of the system of FIG. 1.

FIG. 2 shows a cross-sectional view taken along lines A—A of the system of FIG. 1 in order to consider detail associated with the activated sludge and clarification components of the invention. As in FIG. 1, a series of cells making up anaerobic zone 30 are seen adjacent to, and upstream from, a series of cells making up aerobic zone 34, and clarifying unit 15, which includes inlet chamber 13, settling zone 16 and clarification zone 44. Separating the respective anaerobic and aerobic zones are a suitable number of dividers 35, and separating different components of the system, and separate sections within components are concrete walls 38 anchored by concrete footings 39.

Those skilled in the art will appreciate the manner in which mixers 25 can be employed in the cells making up anaerobic zone 30, and aerators 37 can be employed to improve the performance of the cells making up aerobic zone 34. The clarifying unit employs mixers 19 in order to mix the sludge and avoid build-up on the side edge, while the RAS pump 21 is used to deliver RAS from the settling zone 16 to by means of activated sludge line 59 to a manifold delivery system 66 in a sludge stabilization lagoon in the form of secondary pond 60.

The contour of the activated sludge system can be seen as including a bottom 20, bordered by a berm 23 formed by a grouted or lined slope 26. Preferably the outside walls of the activated sludge reactor and clarifier unit are formed by berms having a slope of 1:1 to 1:3.

Figure 3:
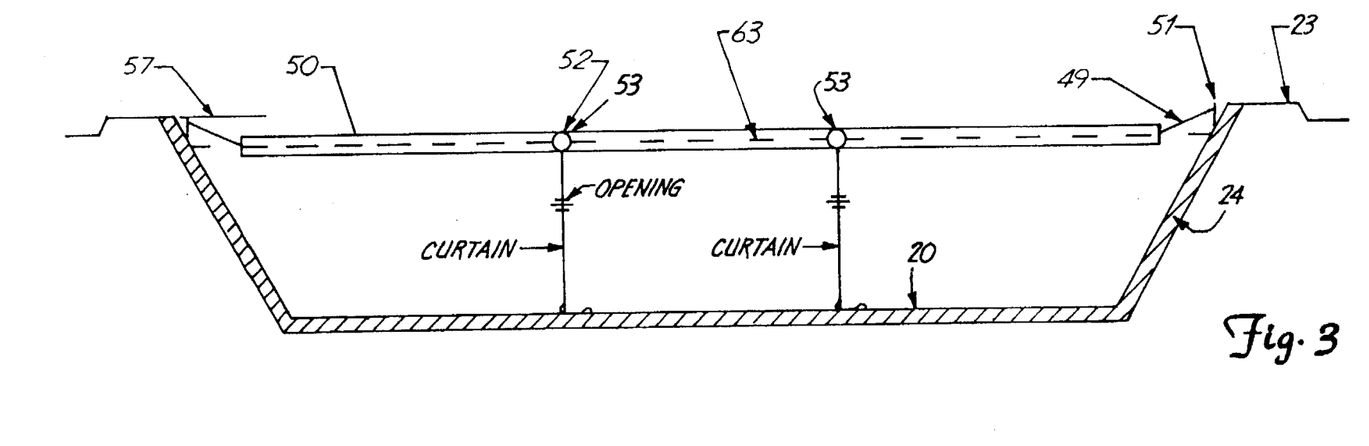
FIG. 3 shows a cross-sectional view taken along lines B—B of the system of FIG. 1.

FIG. 3 shows a cross-sectional view taken along lines B—B of the system of FIG. 1 in order to consider detail associated with the aquaculture pond component of a system of the invention. The pond itself can be seen as formed by bottom 20, leading at its edges to a slope 24 formed of clay or plastic lined material to the top of berm 23. Along the water surface 63 of the pond are floating barriers 50, which are secured by means of cables 49 to the top of berm 23 by anchors 51. The pond system also includes hydraulic baffles 52 (or optionally earthen berms), as well as freeboard 57 above the water surface 63. Hydraulic baffles are suspended on the water surface by means of floats 53. In a preferred embodiment, the pond depth is on the order of at least 2.5 meters (7 feet).

provide from five to twenty cycles per day. The second and third periods of each cycle will generally total about 15 to 30 minutes.

| Time | Mixers (25) | Aerators (37) | RAS Pumps (21) | | Clarifier Mixers (19) | | Actuated Valve (17) |
|---|---|---|---|---|---|---|---|
| | | | A | B | A | B | |
| 10 | ON | ON | ON | ON | ON | OFF | CLOSED |
| 0-10 | ON | ON | ON | ON | OFF | OFF | CLOSED |
| 8-30 | ON | ON | OFF | ON | OFF | OFF | CLOSED |
| Varies | ON | ON | OFF | ON | OFF | OFF | OPEN |
| 10 | ON | ON | ON | ON | OFF | ON | CLOSED |
| 0-10 | ON | ON | ON | ON | OFF | OFF | CLOSED |
| 8-30 | ON | ON | ON | OFF | OFF | OFF | CLOSED |
| Varies | ON | ON | ON | OFF | OFF | OFF | OPEN |

The following protocol is representative of the use of a system as depicted in FIG. 1. Incoming wastewater 70 is optionally subjected to one or more preliminary treatment modules 18, such as bar screen removal (manual or mechanized). The use of a conventional primary clarifier at this stage is optional, but typically not necessary.

Thereafter the waste is initially treated in one or more cells making up anaerobic zone 30, typically for a total detention time of about one-third of an hour to about two hours. From the anaerobic zone the waste in then transferred through opening 32 and treated in one or more cells making up aerobic zone 34 with a total detention time of about two to about eight hours, in order to produce a mixed liquor product.

The mixed liquor product is then transferred through opening 36 to inlet chamber 13, and in turn to settling zone 16, of a clarifying unit 15 as described herein, for a combined detention time of about three to about eight hours. Preferably mixers 19 are activated several times per day to mix the sludge, in order to avoid build-up on the side edge and to freshen the sludge. The mixers 19 are preferably operated alternately and in opposing coordination with the RAS pumps 21 to mix the sludge on one side of the clarifier at a time. Sludge Age will be controlled by the amount of RAS pumped and the amount of sludge wasted. With the mixers on, the actuated valve 17 will be closed for the duration of the mixing, and for an additional 15 to 30 minutes afterward, in order to prevent sludge from entering the effluent line.

The valve 17 will then be opened to allow supernatant to flow into the clarification zone 44 as the final clarification chamber. Those skilled in the art will understand the manner in which the system can be designed so that the water level in the aerobic, anaerobic and clarification chambers will only rise a few centimeters during this phase.

Following clarification, The RAS pumps 21 are operated in order to circulate between about 0.2 and about 0.5 times the influent flow rate. During the mixing phase and for a period following, the RAS pumps 21 will increase the circulation rate to about 0.5 to about 1.0 times the influent flow rate. This will maintain a more or less constant mass flow rate of solids in the RAS flow stream. The RAS pumps 21 are multiple as are the clarifier mixers 19. The RAS pumps 21 and clarifier mixers 19 may be associated together as pairs as shown in the following table as RAS pumps 21A and 21B associated with clarifier mixers 19A and 19B respectively. The table shows a representative schedule of two sequential cycles that would typically be repeated to Effluent from the final clarification zone 44 is allowed to freely enter the aquaculture pond 12 where final settling, polishing, algae control, and flow equalization will take place. Final re-aerating with step cascade or aeration is optional. Additional disinfection with UV, chlorination, ozone are also optional. Water undergoing treatment in the aquaculture polishing pond will generally have a detention time of about 2–5 days.

The sludge product of the clarification process can be treated in any suitable manner. Typically the return activated sludge portion will be returned via RAS line 59 for further processing to one or more appropriate points within the activated sludge sequence. Another portion will be transferred via waste activated sludge line to a location outside the perimeter of the system itself, for disposal or holding.

Preferably waste activated sludge is pumped to a nearby second aquaculture pond 60, of the type described above, for storage and for sterilization and consolidation without routine handling and disposal. This waste sludge inlet can be by means of manifold distribution piping 66 across the bottom of this pond. A matrix of floating barriers 62 is installed on the surface to stabilize the pond and for odor control.

In a manner similar to pond 12, an hydraulic control structure 64 can be used to control pond 60. This sludge pond will typically provide a detention time of about 2 to about 3 days. These conditions will allow the retention of sludge for many years without the need for removal. Supernatant from pond 60 can be delivered via flow path 68 to be used for irrigation or to be returned to a suitable influent point. Pond 60 also provides optional flow path 70 for pumping sludge to drying beds after sufficient stabilization.

Figure 4:
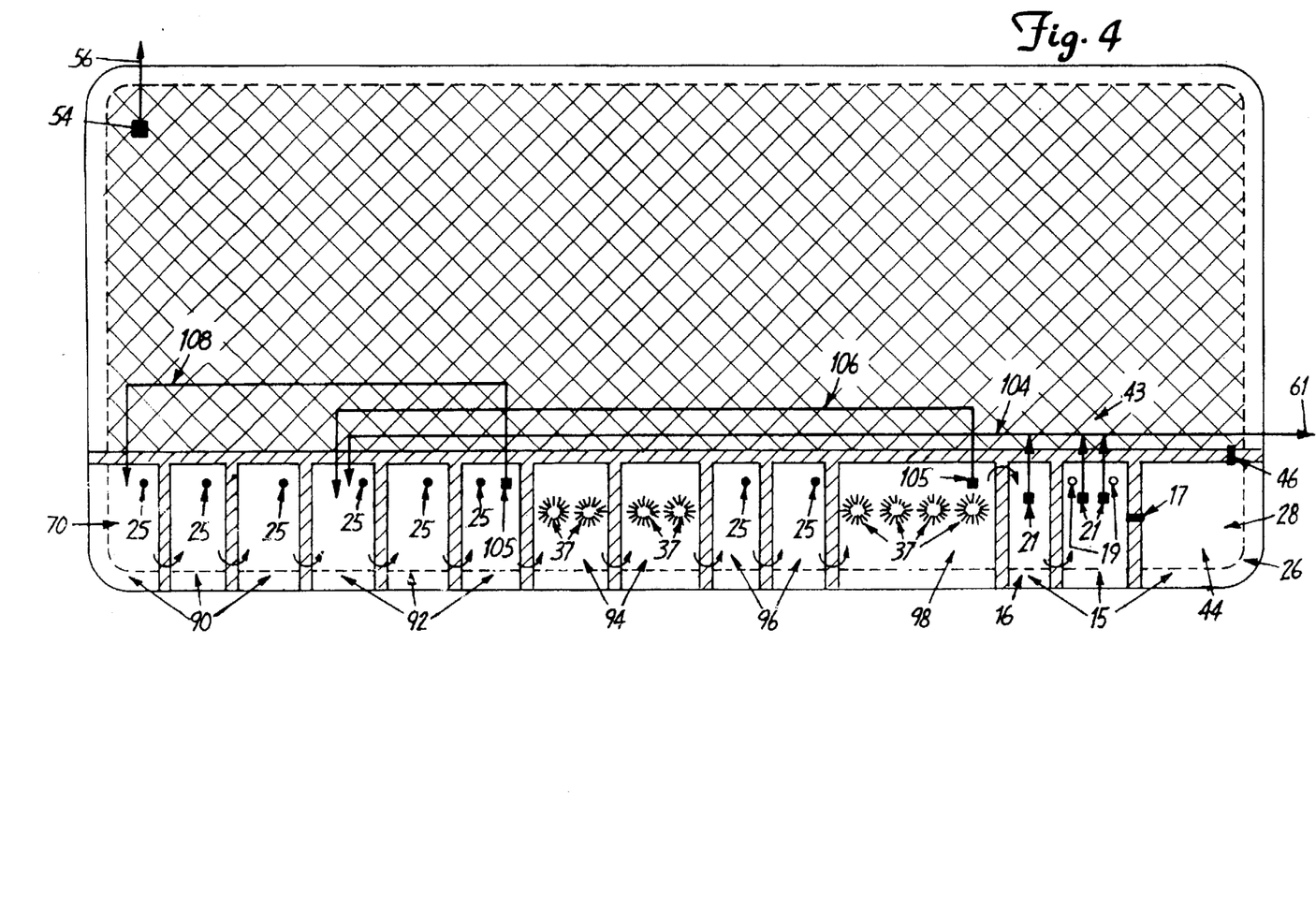
FIG. 4 shows a diagram of a hybrid system of the invention employing a modified "VIP" type single-sludge process.

FIG. 4 shows a diagram of a hybrid system of the invention employing a modified "VIP" type activated sludge process. To enhance denitrification, the system provided in FIG. 4 provides several additional anoxic zones and aerobic zones in sequence as above. These zones can be further divided into as many chambers or cells as desired. In the embodiment depicted in FIG. 4, the process involves, sequentially, a plurality of anaerobic chambers 90, anoxic chambers 92, oxic chambers 94, and anoxic chambers 96, as well as an oxic chamber 98 and a clarifying unit 15 including inlet chamber 13 and final clarification chamber 44. In operation, RAS is delivered through flow path 104 to the first anoxic cell, and mixed liquor is delivered through flow path 106 to the first anoxic cell, and through flow path 108 to the first anaerobic cell.

As above, the aerobic sequences are employed for organic carbon conversion as well as nitrification, i.e., the conversion of ammonium ion to nitrate by nitrifying autotrophic bacteria, and the uptake of phosphorus. The anaerobic sequences are employed to condition the sludge biomass so as to eliminate bulking and to select microorganisms that will subsequently take up phosphorus in the aerobic sequence. Additionally the anoxic sequences are employed for denitrification, i.e., the reduction of nitrate under anaerobic conditions to produce nitrite, nitrous oxide or nitrogen gas.

The RAS, in this case, is returned to the anoxic chamber, instead of being returned directly to the anaerobic chamber. This will help denitrify $NO_2$ just before returning the mixed liquor from this anoxic chamber into the anaerobic chamber for sludge conditioning. The mixed liquor return from the aerobic chamber to the anoxic chamber for $NO_2$ removal remains the same.

In general, the short detention time will allow sufficient nitrification and denitrification because the incoming wastewaters are typically greater than about 10° C. throughout the year. The use of a sufficiently deep reaction chamber in the present system will optimize biological reactions. Other benefits of such a system include the alleviation of bulking sludge and the ability to harvest biomass.

In so doing, the hybrid system of the present invention couples the year-round effectiveness of single-sludge processes with the reduced construction and operating costs associated with a pond system. The result is a system having an optimal combination of such qualities as robustness to variation in temperature and loading as well as ease of operation and maintenance.

The invention has been described with reference to certain preferred embodiments. It is to be understood, however, that even though numerous characteristics and advantages of the present invention have been set forth, the disclosure is illustrative only. Changes may be made in the design and detail, especially in matters of shape, size, and arrangement of parts within the principles of the invention to the full extent indicated by the terms in which the appended claims are expressed.

What is claimed is:

1. A process for the removal of biological nutrients from wastewater, the process comprising the steps of:
    (a) providing;
        (i) an activated sludge system comprising a single-sludge reactor and a clarifier unit, the clarifier unit comprising both a settling zone and a clarification zone, and
        (ii) an aquaculture pond, comprising floating aquatic plants, flowably connected with the activated sludge system;
    (b) treating wastewater in the single-sludge reactor to produce a mixed liquor,
    (c) transferring the mixed liquor to the clarifier unit and operating the clarifier unit to settle a sludge fraction in order to obtain a clarified supernatant fraction,
    (d) transferring clarified supernatant to the aquaculture pond, and
    (e) incubating the pond under conditions suitable to provide a further reduction in contaminants from the clarified supernatant, wherein flow within the clarifier unit can be interrupted in order to decant supernatant.

2. A process according to claim 1 wherein the single sludge reactor is selected from the group consisting of multistage, multiphase/cyclical aeration, oxidation ditches, and sequencing batch reactor systems.

3. A process according to claim 1 wherein the single sludge reactor comprises a multistage system.

4. A process according to claim 3 wherein the multistage system is a pond-based system positioned in apposition to the aquaculture pond.

5. A process according to claim 4 wherein the activated sludge system and aquaculture pond are provided as an integral unit formed within a single overall pond geometry employing a continuous outer wall.

6. A process according to claim 1 wherein the floating aquatic plants comprise duckweed plants.

7. A process according to claim 1 comprising the further steps of:
    (a) dividing the settled sludge into waste and return portions,
    (b) transferring the return portion of the sludge to one or more points in the single-sludge reactor, and
    (c) transferring the waste portion of the sludge to a sludge stabilization lagoon.

8. A process according to claim 1 wherein the activated sludge system and aquaculture pond are provided as an integral unit formed within a single overall pond geometry employing a continuous outer wall having a slope defined by an earthen contour.

9. A process according to claim 8 wherein the outer wall defines a circumference containing the activated sludge system and aquaculture pond.

10. A process according to claim 1 wherein the single-sludge reactor, clarifier unit, and aquaculture pond are each provided in discrete form, separated by impermeable walls.

11. A process according to claim 1 wherein the activated sludge system is selected from the group consisting of: (a) a process in which an anoxic zone is interposed between an anaerobic zone and an aerobic zone; (b) a process employing a sequence of three zones and a recycle of mixed liquor to the anoxic cell; and (c) a process employing multiple, complete mix zones to enhance phosphorus uptake.

12. A process according to claim 1 wherein the clarifier unit comprises in sequence, an inlet chamber, a settling zone, and a clarification zone.

13. A process according to claim 1 wherein the process comprises the further step of distributing waste activated sludge to a sludge stabilization lagoon in the form of a second aquaculture pond.

14. A process for the removal of biological nutrients from wastewater, the process comprising the steps of:
    (a) providing a pond-based activated sludge system comprising a single-sludge reactor and a clarifier unit, and an aquaculture pond, comprising floating aquatic plants, positioned in apposition to, and flowably connected with, the activated sludge system,
    (b) treating wastewater in the single-sludge factor to produce a mixed liquor,
    (c) transferring the mixed liquor to the clarifier unit and operating the clarifier unit to settle a sludge fraction in order to obtain a clarified supernatant fraction,
    (d) transferring clarified supernatant to the aquaculture pond, and
    (e) incubating the pond under conditions suitable to provide a further reduction in contaminants from the clarified supernatant.

15. A process according to claim 14 comprising the further steps of:
    (a) dividing the settled sludge into waste and return portions,
    (b) transferring the return portion of the sludge to one or more points in the single-sludge reactor, and (c) transferring the waste portion of the sludge to a sludge stabilization lagoon.

16. A process according to claim 14 wherein the activated sludge system and aquaculture pond are provided as an integral unit formed within a single overall pond geometry employing a continuous outer wall having a slope defined by an earthen contour.

17. A process according to claim 16 wherein the outer wall defines a circumference containing the activated sludge and aquaculture components.

18. A process according to claim 14 wherein the single-sludge reactor, clarifier unit, and aquaculture pond are each provided in discrete form, separated by impermeable walls.

19. A process according to claim 14 wherein the activated sludge process is selected from the group consisting of: (a) a process in which an anoxic zone is interposed between an anaerobic zone and an aerobic zone; (b) a process employing a sequence of three zones and a recycle of mixed liquor to the anoxic cell; and (c) a process employing multiple, complete mix zones to enhance phosphorus uptake.

20. A process according to claim 14 wherein the clarifier unit comprises in sequence, an inlet chamber, a settling zone, and a clarification zone.

21. A process according to claim 14 wherein the process comprises the further step of distributing waste activated sludge to a sludge stabilization lagoon in the form of a second aquaculture pond.

22. A process according to claim 14 wherein the floating aquatic plants comprise duckweed plants.

23. A process according to claim 14 wherein the single sludge reactor is selected from the group consisting of multistage, multiphase/cyclical aeration, oxidation ditches, and sequencing batch reactor systems.

24. A process according to claim 23 wherein the single sludge reactor comprises a multistage system.

25. A process according to claim 24 wherein the multistage system is a pond-based system positioned in apposition to the aquaculture pond.

26. A process according to claim 25 wherein the activated sludge system and aquaculture pond are provided as an integral unit formed within a single overall pond geometry employing a continuous outer wall.

27. A hybrid system for the removal of biological nutrients from wastewater, the hybrid system comprising:
   (a) a pond-based activated sludge system comprising;
      (i) an activated sludge reactor for initial biological oxidation of organic matter to produce a mixed liquor, and
      (ii) a clarifier unit flowably connected to the activated sludge reactor for the separation of clarified supernatant and settled sludge from the mixed liquor, and
   (b) an aquaculture pond, comprising floating aquatic plants, flowably connected to the clarifier unit for providing a further reduction in organic matter and suspended solids from the clarified supernatant, wherein flow within the clarifier unit can be interrupted in order to decant supernatant.

28. A hybrid system according to claim 27 wherein the single-sludge reactor comprises a continuous flow, multi-stage activated sludge reactor, and the clarifier unit comprises an inlet chamber, settling zone, and final clarification zone.

29. A hybrid system according to claim 27 wherein the activated sludge and aquaculture components are provided as an integral unit formed within a single overall pond geometry employing a continuous outer wall having a slope defined by the surrounding earthen contour.

30. A process according to claim 29 wherein the outer wall defines a circumference containing the activated sludge and aquaculture components.

31. A hybrid system according to claim 27 wherein the single-sludge reactor, clarifier unit, and aquaculture pond are each provided in discrete form, separated by impermeable walls.

32. A hybrid system according to claim 27 further comprising a second aquaculture pond useful as a sludge stabilization lagoon for a waste portion of the settled sludge.

33. A system according to claim 27 wherein the floating aquatic plants comprise duckweed plants.

34. A system according to claim 33 wherein the aquaculture pond is positioned in apposition to the activated sludge system.

35. A system according to claim 33 wherein the single-sludge reactor, clarifier unit, and aquaculture pond are each provided in discrete form, separated by impermeable walls.

36. A system according to claim 27 further comprising means for:
   (a) dividing the settled sludge into waste and return portions,
   (b) transferring the return portion of the sludge to one or more points in the single-sludge reactor, and
   (c) transferring the waste portion of the sludge to a sludge stabilization lagoon.

37. A system according to claim 27 wherein the activated sludge system and aquaculture pond are provided as an integral unit formed within a single overall pond geometry employing a continuous outer wall having a slope defined by an earthen contour.

38. A system according to claim 37 wherein the outer wall defines a circumference containing the activated sludge and aquaculture components.

39. A system according to claim 27 wherein the activated sludge system is selected from the group consisting of: (a) a process in which an anoxic zone is interposed between an anaerobic zone and an aerobic zone; (b) a process employing a sequence of three zones and a recycle of mixed liquor to the anoxic cell; and (c) a process employing multiple, complete mix zones to enhance phosphorus uptake.

40. A system according to claim 27 wherein the clarifier unit comprises in sequence, an inlet chamber, a settling zone, and a clarification zone.

41. A system according to claim 27 wherein the process comprises means for distributing waste activated sludge to a sludge stabilization lagoon in the form of a second aquaculture pond.

* * * * *